United States Patent [19] [11] 4,279,851
Lord et al. [45] Jul. 21, 1981

[54] METHOD AND APPARATUS FOR EXTRUDING TUBULAR JACKETS

[75] Inventors: Herbert A. Lord, Mercer County, N.J.; Randy G. Schneider, Gwinnett County, Ga.

[73] Assignee: Western Electric Company, Inc., New York, N.Y.

[21] Appl. No.: 90,173

[22] Filed: Nov. 1, 1979

[51] Int. Cl.³ .............................................. B29F 3/10
[52] U.S. Cl. .............................. 264/174; 156/244.13; 264/209.1; 425/113; 425/114; 425/380; 425/467; 427/117
[58] Field of Search ...................... 264/174, 209, 40.7; 425/113, 114, 380, 467; 427/117, 120; 156/244.11–244.13

[56] References Cited

U.S. PATENT DOCUMENTS

| 2,943,352 | 7/1960 | Van Riper | 425/380 |
| 3,026,565 | 3/1962 | Bonner | 425/380 |
| 3,345,690 | 10/1967 | Hagen | 264/209 |
| 3,579,731 | 5/1971 | Cooper | 425/113 |
| 3,737,260 | 6/1973 | Kaye | 425/113 |
| 3,801,254 | 4/1974 | Godtner | 425/380 |
| 3,833,325 | 9/1974 | Ramsey | 425/380 |
| 3,860,686 | 1/1975 | Myers | 264/174 |
| 3,876,740 | 4/1975 | Egli et al. | 264/48 |
| 3,903,233 | 9/1975 | Dougherty | 264/174 |
| 3,976,419 | 8/1976 | Egli et al. | 425/467 |

OTHER PUBLICATIONS

"The Fluid Mechanics & Heat Transfer of Injection Mold Filling of Thermoplastic Materials", Y. Kuo et al., AIChE Journal, vol. 22, No. 4, pp. 661–669, 7-1976.
"Devices" Crosshead Diverter Tube Model 8" 20:1, by Sterling Extruder Corp. of South Plainfield, N.J.

Primary Examiner—Jeffery R. Thurlow
Attorney, Agent, or Firm—Robert B. Kennedy

[57] ABSTRACT

Methods and apparatuses are disclosed for extruding tubular jackets of uniform radial thicknesses about cables employing a diverter tube assembly 10 that provides a divergent flow path for a plastic fluid from diametrically opposite channel orifices 46 to a tubular confluence. The diverter tube circumference is between 22 and 50 times the prespread width of each channel orifice while the axial to lateral spread ratio of the divergent flow path is between 1:2 tangent 30° and 1:2 tangent 40°.

6 Claims, 3 Drawing Figures

METHOD AND APPARATUS FOR EXTRUDING TUBULAR JACKETS

TECHNICAL FIELD

This invention relates to methods and apparatuses for extruding tubular jackets about cables and the like.

BACKGROUND OF THE INVENTION

In the manufacture of telecommunications cable a protective plastic jacket is often extruded over a filamentary cable core. This is done with an extruder of the type having a crosshead. The crosshead serves to redirect and to reconfigure a stream of plastic fluid of solid, usually cylindrical shape into a tubular shape about the cable. This is performed with the use of a diverter tube, also sometimes referred to as a compensation tube, that is seated within a cylindrical cavity of a crosshead block. The interior surface of the diverter tube is sized to receive a cable core passed linearly therethrough, or to receive a core tube holder through which the cable core is passed, while its generally cylindrical exterior surface is provided with raised lands that define channels. These channels are shaped so as to redirect the flow of plastic fluid introduced into the crosshead some 90° and to divide it into two or more streams that are routed to a plurality of diverter tube channel orifices spaced radially along the cylindrical cavity. From here the configuration of the raised lands is such as to permit the plastic fluid to spread into a tubular confluence that is drawn down upon the cable core in the extruder die.

As the fluidic plastic material must ordinarily follow a flow path having changes in both direction and path size, flow imbalance conditions are inherently created. These flow imbalances, wherein various portions of the flow at any one point along the path travel at different speeds, create radial variations in the thickness of the wall of the tubular confluence once it has solidified into a jacket. Since some minimum wall thickness is required for proper cable performance, these circumferential variations in jacket thickness must be compensated for by an increase in the average wall thickness. This, of course, increases manufacturing costs.

The just described problem of wall thickness variations in extruded, tubular jackets has heretofore been recognized and attempts made at providing solutions. These solutions have taken the form of crosshead designs that divide the stream of plastic fluid delivered to the crosshead into several smaller branch streams that are routed radially about the cable and then recombined into a tubular confluent stream to equalize the flow rate of plastic radially onto the cable. This has been done on a volumetric or flow rate basis neglecting pressure and velocity distributions in the plastic stream. Though such designs have improved concentricity and roundness of tubular extrusions, they have not been satisfactory when the plastic utilized has been of a highly viscous or elastic type. Molten polypropylene or medium density polyethylene, for example, when moving through a conduit is subjected to shear stresses that result in substantial velocity and pressure gradients, particularly in channel bends and enlargements, which do not readily return to steady state fluid flow conditions.

Two examples of the just described approaches are shown in U.S. Pat. Nos. 3,579,731 and 3,860,686. The former patent here discloses a crosshead having a compensation or diverter tube formed with an annular restriction located downstream of a fluid delivery port. The restriction has an axial length that tapers from an axially long surface located radially adjacent the delivery port to an axially short surface located radially opposite the delivery port. This construction has been found to perform well where the taper is designed for a specific flow rate of a plastic fluid of known viscosity. Its effectiveness, however, is diminished significantly when plastic fluids of other viscosities are used or where other flow rates are employed. The latter patent provides a lengthening of the flow paths within the crosshead so that the plastic has a longer time in which to dampen out flow pattern distrubances and to achieve steady state flow conditions before contacting an advancing wire. Specifically, a highly viscous fluent plastic stream is divided into smaller streams that are routed along paths that have both radially and axially oriented path segments that ultimately merge into an annular confluence. This methods does provide enhanced flow balance characteristics but achieves such with apparatus that is complex and costly. Furthermore, use has been limited to the application of extruded insulation about wires. It would be quite difficult to use this in the manufacture of cables due to the size limitation which flow and pressure requirements impose on cable jacket extruders.

It thus is seen that the need remains for the development of practical and cost effective methods and means for extruding plastic jackets of uniform tubular wall thicknesses about cables and the like. It is this problem to which the present invention is primarily directed.

SUMMARY OF THE INVENTION

In one preferred form of the invention a method is provided for extruding a plastic jacket about a cable being advanced through an extruder crosshead. The method comprises the steps of forcing a stream of plastic fluid into the crosshead and bifurcating the stream into two branch streams. Each branch stream is channeled to two diametrically opposite locations about the cable where each stream is shaped with a selected prespread width. Each stream is spread from each of these locations into a confluent stream about the cable of tubular shape having a circumference of between 22 and 50 times the prespread width of each branch stream at an axial to lateral spread ratio of between 1:2 tangent 30° and 1:2 tangent 40°.

In another preferred form of the invention apparatus is provided for extruding plastic tubes. The apparatus includes a diverter tube mountable within an interior cylindrical wall of an extruder crosshead for forming a stream of plastic fluid introduced into the crosshead through an entrance port in the crosshead interior wall into a tubular shape of uniform wall thickness. The exterior surface of the diverter tube has raised lands that define first channel means for channeling plastic fluid from the entrance port to two diametrically opposite channel orifices of the same width as measured circumferentially. The raised lands also define second channel means for spreading the plastic fluid out from the channel orifices into a recombined stream of tubular configuration having a circumference of between 22 and 50 times the prespread widths of each orifice at an axial to lateral spread ratio of between 1:2 tangent 30° and 1:2 tangent 40° along the exterior surface of the diverter tube.

DETAILED DESCRIPTION

Figure 1:
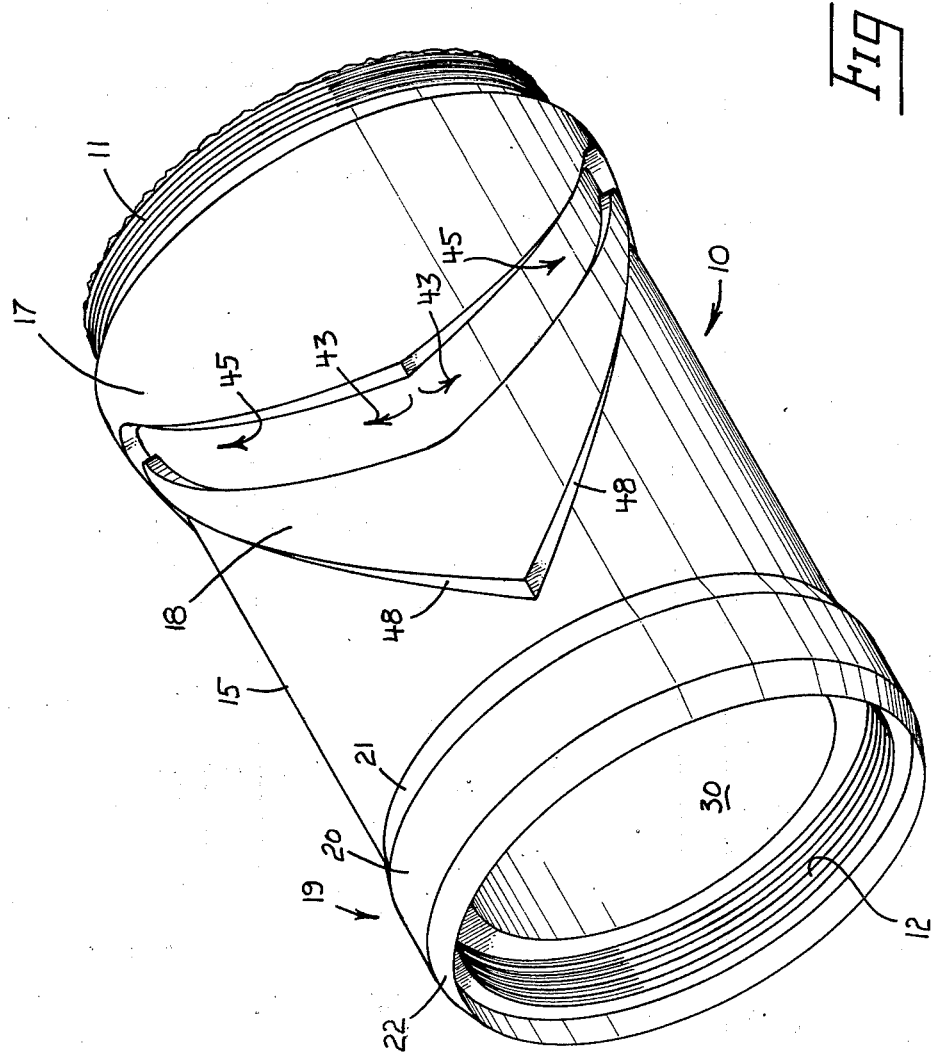
FIG. 1 is a perspective view of a diverter tube for an extruder constructed in accordance with principles of the invention.

Referring now in more detail to the drawing, there is shown a diverter tube assembly 10 comprised of a diverter tube and core tube holder 30 embodying principles of the present invention having male screw threads 11 at an upstream assembly end and female screw threads 12 at a downstream assembly end. The diverter tube has an interior, cylindrical surface 14 and a generally cylindrical exterior surface 15. Three mutually spaced, raised lands 17, 18 and 19 are formed on the exterior surface 15 with the outwardly facing surfaces of lands 17 and 18 lying in a common boundary about the tube axis between upright land sides. The land 19 also has a cylindrical surface 20 lying along a cylindrical boundary coaxially that of but of a radius less than lands 17 and 18. The sides 21 and 22 of the cylindrical surface 20 of land 19 are ramped.

Figure 2:
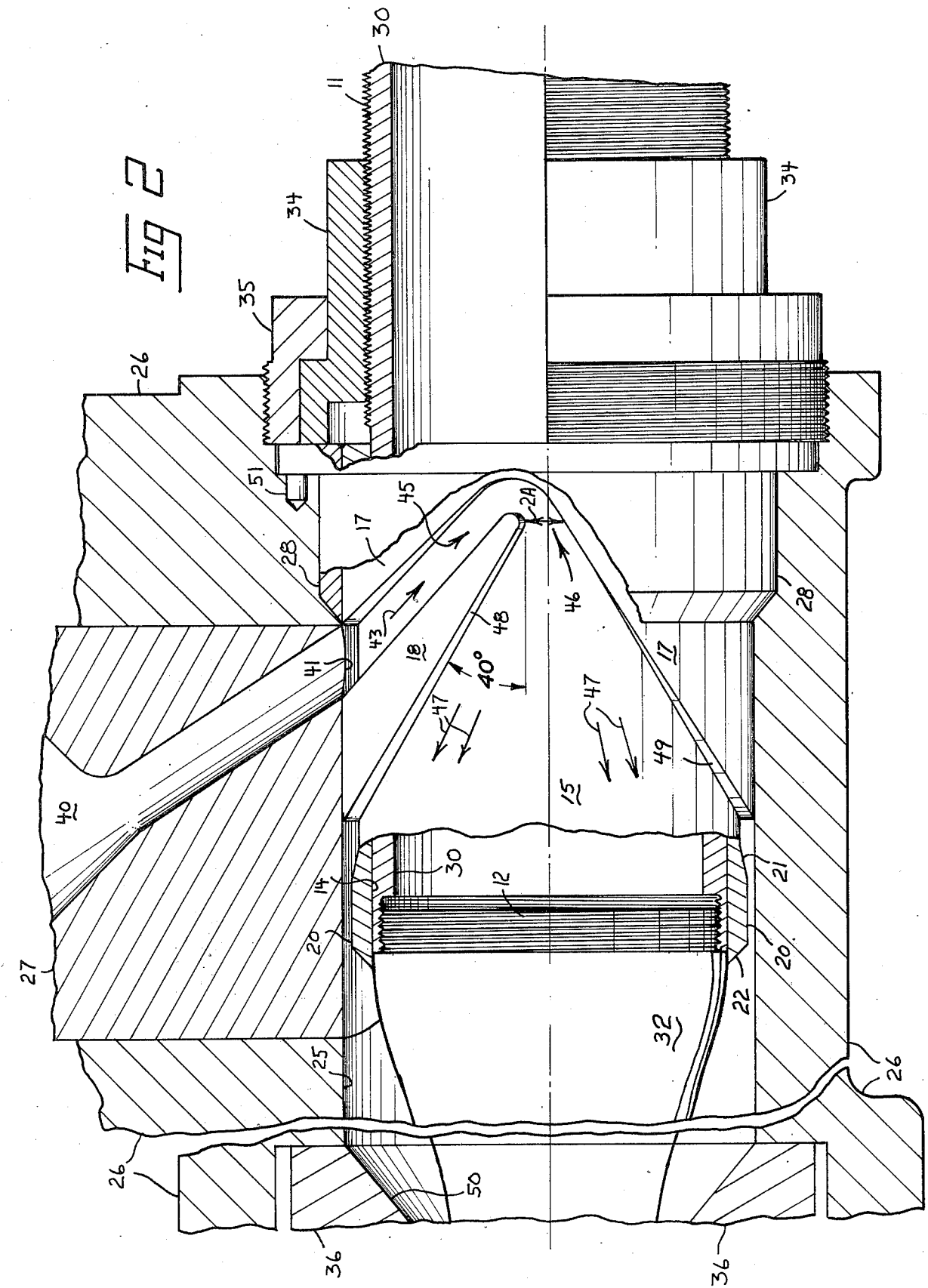
FIG. 2 is a side view, partially in cross-section, of the diverter tube illustrated in FIG. 1 shown mounted in an extruder crosshead.

With reference next to FIG. 2, the diverter tube is seen to be mounted within a crosshead of an extruder such as a Model 8" 20:1 manufactured by John Royle & Sons. Specifically, the diverter tube is mounted within cylindrical walls 25 of a crosshead block 26 and of a velocity block 27 secured to the crosshead block. Proper radial positioning of the diverter tube is conventionally achieved with a dowel pin 51 locating the sealing ring 28 to the crosshead block 26. Longitudinal positioning of the diverter tube is conventionally achieved through a diverter tube sealing ring 28 that abuts an interior conical surface of the crosshead block adjacent the velocity block, and with the cylindrical surfaces of lands 17 and 18 positioned flush against the cylindrical wall 25. Axial positioning of the core tube is also achieved conventionally with the core tube holder 30, core tube positioning nut 34 screwed upon threads 11, and locking ring 35 adjacent the upstream of the diverter tube. A core tube 32 is screwed into threads 12 of the core tube holder 30 and a die holder 36 is mounted coaxially the core and diverter tubes adjacent their downstream ends.

In operation a filamentary cable core, with or without a metal taped shield, is routed through the extruder crosshead passing through the bores of the core tube holder and core tube and then through an unshown extruder die located downstream the core tube. A stream of plastic fluid such as polypropylene, polyethylene or polyvinyl chloride is forced under pressure such as some 1500 to 2500 psi through a passage 40 in the velocity block 27 and out of velocity block orifice 41 between the lands 17 and 18 of the diverter tube 10. From here the stream is bifurcated into two branch streams indicated by arrows 43 which flow through channels 45 between lands 17 and 18 to two channel orifices 46 of circumferentially measured widths 2A. Preferably the channels 45 narrow as they approach the orifices. From the orifices the two streams of plastic fluid spread out as shown by arrows 47 between upright surfaces 48 and 49 of lands 17 and 18 at the 80° total spread angle shown until they are recombined in a confluent stream of hollow, cylindrical shape just upstream from the land 19. The confluent stream then flows axially over the raised land 19 which causes it to thin. Finally, the stream is drawn down upon the cable core by flowing over the conical wall 50 of the die holder and then flowing between the core tube and an unshown die.

The remainder of the description is devoted principally to an explanation of the discoveries which have now been made relative to the relationships of the sizes of the orifices 46 to that of the diverter tube circumference, and of the flow spread angles involved. Observance of these relationships in providing apparatuses and methods in accordance with the invention produce enhanced circumferential uniformity of fluid flow patterns which in turn result in improved radial uniformity of extrusion wall thicknesses.

As previously stated, it has been discovered that a substantial improvement in flow rate uniformity may be achieved by the use of certain flow channeling criteria. This has been proven empirically by comparison tests made with a prior art diverter tube, for use on 8" screw diameter 20:1 extruders. This diverter tube has orifice widths 2A of 1.75 inches and spread angles a of 45° as denoted in FIG. 3. The diverter tube shown in FIGS. 1 and 2 was also tested having an identical 6.5" tube diameter, an orifice width 2A of 0.67 inches and 40° spread angles a. Both diverter tubes were used in the previously identified extruder into which low density polyethylene was extruded at multiple flow rates in the range of 500 to 1500 lb/hr and at pressures in the 1500–2500 psi range. Since the objective was to provide a uniform rate of plastic flow at the entrance to the core tube and die, the flow was measured radially at this point. This was done by removing the die holder and core tube from the extruder and installing an "X" patterned knife edge in place of the die holder. In this manner the flow from each quadrant of the diverter tube was individually cut and weighed at various extruder speeds. The results were tabulated as follows:

TABLE I

| Quadrant | Prior Art (% of material) | Test (% of material) |
| --- | --- | --- |
| Top | 36% | 27% |
| Bottom | 36% | 26% |
| Right | 78% | 25% |
| Left | 10% | 22% |

This test revealed that whereas the prior art diverter tube produced an imbalance of 0.36/0.10 or 260% more in the top quadrant than in the left quadrant the Test diverter tube produced an imbalance of only 0.27/0.22 or 23% more in the top than in the left quadrant. Of course these imbalances were at the test point only and would have been substantially reduced once the flow had reached the core tube and die assembly. Nevertheless, such prior art diverter tubes do provide cable wall eccentricities of approximately 10% from one quadrant to another. Final product tests using the new diverter tube show jacket wall eccentricities of only 1% between quadrants or an order of magnitude improvement.

One method of treating the problem of two dimensional flow of polymeric melts has been proposed by Kuo and Kamal in *The Fluid Mechanics and Heat Transfer of Injection Mold Filling of Thermoplastic Materials,*

AIChE Journal, Vol. 22, No. 4 pp. 661-669, July, 1976, who use a modified definition of the stream function ψ, and show that ψ approximately satisfies the equation $$\nabla^2 \psi = 0$$

Since this equation is Laplace's equation, which governs the voltage distribution in an electrically resisting medium, streamlines can be plotted using electrical analog techniques. If the temperature and flow rate are constant at the channel exit, which is the situation desired, then streamlines separated by a constant increment in stream function will be equally spaced geometrically. Conversely, a flow channel geometry that produces equally spaced streamlines at the channel exit is a geometry that would produce a circumferentially uniform flow at the channel exit. It thus is seen that stream functions may be generated that reveal flow patterns of polymer fluid flows within an extruder diverter tube.

In view of the foregoing, and in an effort to develop a more comprehensive understanding here of the functional relationships and limitations involved with respect to orifice to diverter tube size relations and of spread angles, analog field plots were produced in accordance with the above criteria. The results were computed as a ratio of the smallest to largest streamline spacings. Thus an ideal ratio would be 1.0 while a 1.5 ratio would represent a 50% in worse case differential in flow velocities.

As one check on the applicability of the assumptions of potential flow to this problem of non-Newtonian viscosity polymer flow, pressure drops were calculated along the streamlines produced. In theory, the pressure drops along every streamline flow path in a given design should be the same. For a variety of materials, flow rates, and diverter tube designs, the errors introduced by the application of potential flow were found to result in pressure non-uniformities of less than 10%. These results thus provide indirect support for using analog fields plotting to evaluate the relationship of orifice to diverter tube sizes and flow spread angles regardless of the polymer being processed, a conclusion independently reached by Kuo and Kamal for other flow geometries. The results using the stream function plotting routine previously described were tabulated as follows:

TABLE II

| Spread Angle (a) | Orifice to Tube Size Ratio (A to C) | Imbalance Ratio |
|---|---|---|
| 40° | .06 | 1.13 |
| 40° | .10 | 1.14 |
| 40° | .137 | 1.16 |
| 50° | .06 | 1.21 |
| 50° | .10 | 1.24 |
| 50° | .137 | 1.31 |
| 60° | .06 | 1.36 |
| 60° | .10 | 1.47 |
| 60° | .137 | 1.68 |

Figure 3:
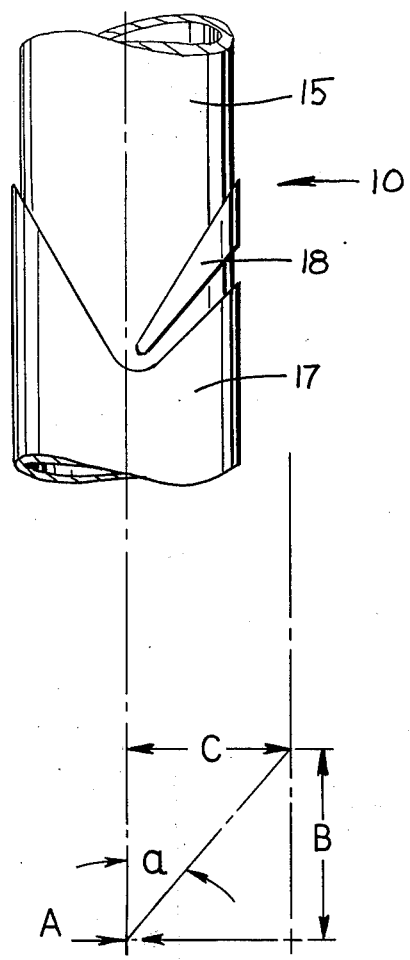
FIG. 3 is a diagram illustrating certain dimensional relations for reference herein.

These results may be best understood by reference to FIG. 3 in which the circumferentially measured dimensions of orifice width and tube size are transferred to planar dimensions A and C, respectively, with A representing ½ of the width of one orifice, B representing the axial distance from orifice to the axial ends of lands 17 and 18, C representing ¼ of the diverter tube circumference, and a representing ½ the spread angle of flow out from an orifice. The Table II results reveal that angle a should not exceed 40°. A lower limit of angle a is 30° since smaller angles render the diverter tube so long as to produce other problems such as excessive length, cost, and pressure drops. Thus preferably the angle a should be between 30° and 40° or at a B to C ratio of between 1: tangent 30° and 1 :tangent 40°. This table also shows that the greater the difference in linear size between A and C the better the flow pattern balance. Again, however, certain practicalities do impose limits since were A to be made extremely small the pressures encountered would be too great for the extruder to handle. The preferred ratio of A to C is thus from 0.04 to 0.09 which may be translated to a diverter tube circumference of between 22 and 50 times the complete width of each orifice. With the flow pattern now substantially uniform, pressure and viscosity changes have minimal effect.

Thus it is seen that a method and apparatus is provided for extruding plastic tubes such as jackets about cables having improved uniformity of tubular wall thickness. Although the invention has been described with reference to the specific application of forming a tubular jacket about a cable, it may be employed in numerous other applications wherein a plastic tube is to be extruded. Thus, it should be understood that the particularly described embodiment merely illustrates principles of the invention in one preferred form. Many modifications, additions and deletions may be made thereto without departure from the spirit and scope of the invention as set forth in the following claims.

What is claimed is:

1. A method of extruding a plastic jacket onto a cable being advanced through an extruder crosshead which comprises the steps of:
    (a) forcing a stream of plastic fluid into the crosshead;
    (b) bifurcating the stream of plastic fluid into two branch streams:
    (c) channeling the branch streams to two diametrically opposite locations about the cable where each stream is shaped with a prespread width;
    (d) directing each branch stream from the locations axially along the cable while spreading each branch stream at an axial to lateral spread ratio of between approximately 1:2 tangent 30° and 1:2 tangent 40° into a confluent stream about the cable of tubular shape having a circumference of between approximately 22 and 50 times that of the prespread width of each branch stream at said locations; and
    (e) extruding the confluent stream onto the cable.

2. The method of extruding a plastic jacket onto a cable in accordance with claim 1 wherein during step (c) the branch streams are narrowed.

3. The method of extruding a plastic jacket in accordance with claim 1 wherein between steps (d) and (e) the walls of the tubular shaped confluent stream are thinned.

4. A diverter tube mountable within an interior cylindrical wall of an extruder crosshead for forming a stream of plastic fluid introduced into the crosshead through an entrance port in the crosshead interior wall into a tubular shape of uniform wall thickness and with the exterior surface of said diverted tube having raised lands defining first channel means for channeling plastic fluid from the entrance port to two diametrically opposite channel orifices of the same circumferential width, and wherein said raised lands further define second channel means for spreading the plastic fluid out from said orifices at an axial to lateral spread ratio of between approximately 1:2 tangent 30° and 1:2 tangent 40° along the exterior surface of the diverter tube into a recombined stream of tubular configuration having a circumference of between approximately 22 and 50 times the complete prespread width of each channel orifice.

5. A diverter tube in accordance with claim 4 wherein said first channel means includes means for narrowing the flows of plastic fluid being channeled from the entrance port to the two channel orifices.

6. A diverter tube in accordance with claim 4 having another raised land annular configuration axially spaced from said raised lands defining restriction means for thinning the recombined stream of tubular configuration.

* * * * *

UNITED STATES PATENT AND TRADEMARK OFFICE
CERTIFICATE OF CORRECTION

PATENT NO. : 4,279,851
DATED : July 21, 1981
INVENTOR(S) : Herbert A. Lord
Randy G. Schneider It is certified that error appears in the above—identified patent and that said Letters Patent is hereby corrected as shown below:

Col. 4, line 48 change "78%" to read ---18%---

Col. 6, line 36 change "streams:" to read ---streams;---.

Signed and Sealed this

Twenty-second Day of September 1981

[SEAL]

Attest:

Attesting Officer

GERALD J. MOSSINGHOFF
Commissioner of Patents and Trademarks